United States Patent [19]

Shevlin

[11] 3,904,778
[45] Sept. 9, 1975

[54] METHOD FOR STORING AND COOKING FOOD

[75] Inventor: Thomas S. Shevlin, White Bear Lake, Minn.

[73] Assignee: Minnesota Mining and Manufacturing Company, St. Paul, Minn.

[22] Filed: Oct. 15, 1973

[21] Appl. No.: 406,574

Related U.S. Application Data

[60] Division of Ser. No. 344,830, March 26, 1973, Pat. No. 3,784,787, which is a continuation-in-part of Ser. No. 173,414, Aug. 20, 1971, Pat. No. 3,736,981.

[52] U.S. Cl. ............... 426/418; 426/523; 426/524; 426/114
[51] Int. Cl.² ............... A23L 1/00; A23C 3/04
[58] Field of Search .......... 426/523, 524, 407, 234, 426/237, 393, 394, 397, 403, 407, 418, 115, 114; 219/385–387, 432, 433; 99/327, 332, 359

[56] References Cited
UNITED STATES PATENTS

| | | | |
|---|---|---|---|
| 2,504,132 | 4/1950 | Jones | 219/386 |
| 2,704,319 | 3/1955 | Lott | 219/387 |
| 2,906,620 | 9/1959 | Jung | 426/524 |
| 2,948,798 | 8/1960 | Nees | 219/387 |
| 2,976,390 | 3/1961 | Stemp | 219/387 |
| 3,205,033 | 9/1965 | Stentz | 219/386 |
| 3,244,537 | 4/1966 | Cease | 426/407 |
| 3,381,115 | 4/1968 | Welch | 219/387 |
| 3,385,952 | 5/1968 | Mix | 426/523 |
| 3,573,430 | 4/1971 | Eisler | 219/385 |

Primary Examiner—Norman Yudkoff
Assistant Examiner—Martin G. Mullen
Attorney, Agent, or Firm—Alexander, Sell, Steldt & DeLaHunt

[57] ABSTRACT

A method for storing food portions in a plurality of individual thermally insulated casseroles on a tray wherein food in selected casseroles is cooked while continuing to store uncooked food in the remaining casseroles. The entree and individual side dish food portions are each placed in separate casseroles in chilled or frozen condition. Each casserole thermally encloses the separate food portions and the thermal insulation of the casserole and the initial low temperature levels of the chilled or frozen food retains the food in the casseroles without degradation or pathogenic effects for storage periods up through several hours and retains the side dish food without pathogenic degeneration during the time the entree food is cooked in separate casseroles.

1 Claim, 3 Drawing Figures

PATENTED SEP 9 1975    3,904,778
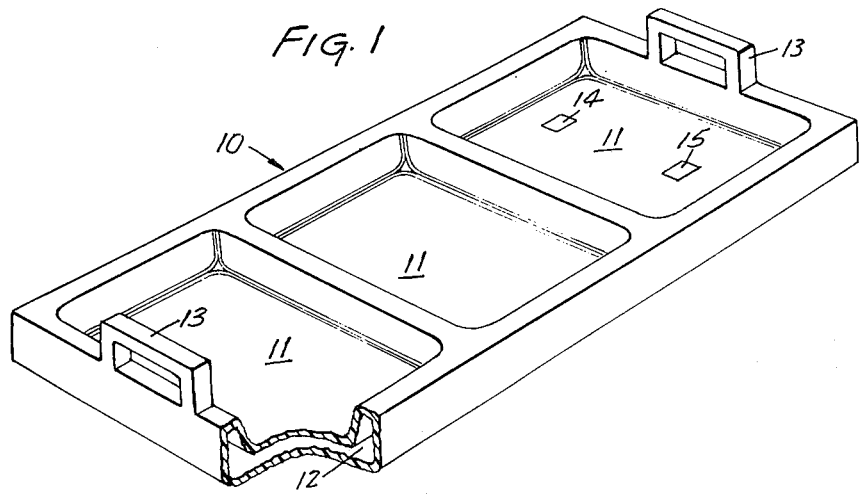
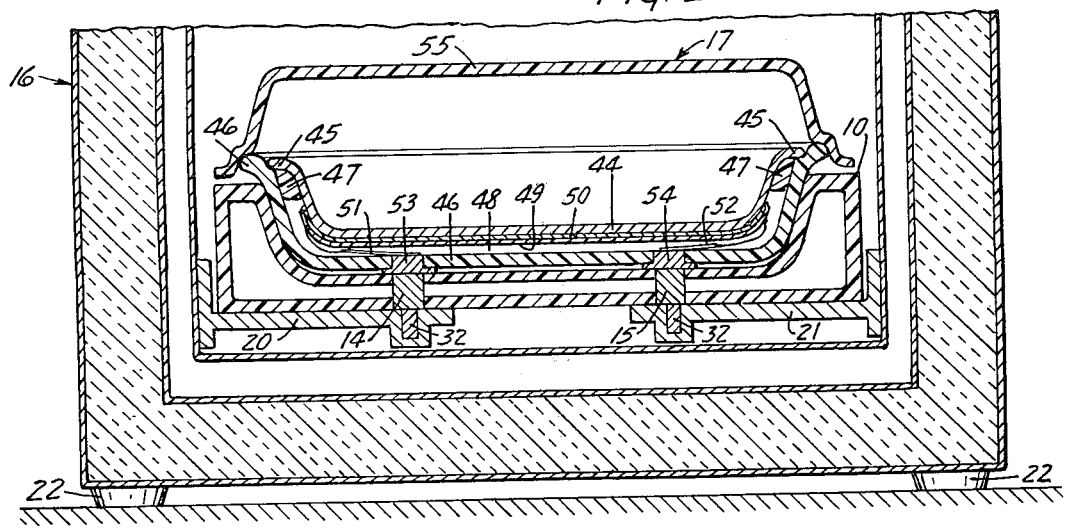
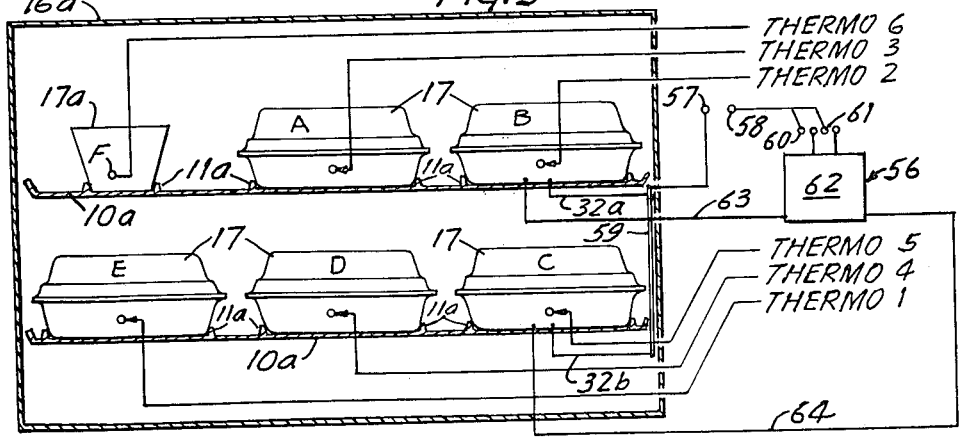

METHOD FOR STORING AND COOKING FOOD

BACKGROUND OF THE INVENTION

This is a division of application Ser. No. 344,830 filed Mar. 26, 1973 which has now matured into U.S. Pat. No. 3,784,787. Application Ser. No. 344,830 in turn is a continuation-in-part of application Ser. No. 173,414 filed Aug. 20, 1971 now matured into U.S. Pat. No. 3,736,981.

This invention relates to a device for storing and cooking a series of full course meals by completely enclosing the individual portions of the meal, such as the main course or entree and the side dishes (e.g., salad, ice cream, etc.) in separate thermally insulated casseroles. The food portions are placed in the casseroles in chilled or frozen state so that the low temperature levels of the food along with the thermal insulation of the individual casseroles retain the food at comparatively low temperature levels during storage and cooking of the entree food and retard bacterial growth to prevent harmful pathogenic effects. Food may be stored up through several hours and the entree subsequently cooked without degradation of the entree or side dish food.

The prior art, such as Shevlin U.S. Pat. No. 3,608,627 and the co-pending application are directed to placing the casseroles in a refrigerated or freezing chamber and cooking selected casseroles while in the refrigerated chamber. Welch U.S. Pat. No. 3,381,115 is directed to an electrically heated container with individual food portions placed in open wells such as 14, 16, and 18.

The Shevlin patent and the co-pending application require a refrigerated chamber. Welch requires the placement of individual food portions in the open wells of his tray. Heat is conducted through the tray per se from well to well.

In this instant application the invention resides in utilizing the thermally insulated casseroles 17 of the co-pending application as well as other insulated vessels of styrofoam and the like and the comparatively low initial temperature levels of the food to retain the food without harmful degeneration during storage periods of up to several hours duration and during the cooking of the entree immediately after storage. It is, thus, not necessary to retain the tray and its food-laden casseroles in a chamber maintained at freezing or refrigerated temperatures during the storage and cooking or heating periods.

SUMMARY OF THE INVENTION

This invention discloses a system for storing and selectively cooking pre-chilled or frozen entree food while simultaneously storing side dish food and any entrees not selected for cooking in individually thermally insulated casseroles placed on a plurality of trays, each tray having means to retain the individual casseroles in spaced-apart relationship. The tray and casseroles may be constructed the same as shown in the co-pending application.

The individual casseroles on each tray consist of a heating casserole with an associated electric heating element to contain and cook entree food and one or more unheated casseroles containing frozen or chilled side dish food to be served with the entree. The food is placed in each casserole in frozen or chilled condition, that is the food is in refrigerated state when placed in the casseroles.

The combination of the low temperature of the food and the thermal insulation provided by the casseroles prevents any pathogenic damage to the food by bacterial action during non-refrigerated storage periods up through several hours prior to serving.

The tray and food-laden casseroles may be placed in any type of box-like container. The container per se may or may not provide thermal insulation. The container does not provide any heat for cooking the food or refrigeration means to cool the food. Its purpose is to slideably retain a plurality of trays and provide electrical connection with the heating element of each heating casserole.

The heating casseroles on individual trays may be selectively energized by means of a timing device which energizes the heating element of selected heating casseroles in on-and-off intervals. After cooking the food in a selected heating casserole, the heating casserole and its associated side dish casseroles are removed from the container by means of the trays and served thereon.

DESCRIPTION OF THE DRAWINGS

Understanding of the invention will be facilitated by referring to the accompanying drawings in which like numerals refer to like parts in the several views and in which:

FIG. 1 is a perspective view partially broken away of an exemplary serving tray adapted to hold a heating casserole for cooking the entree and two unheated casseroles for containing side dishes served with the entree;

FIG. 2 is a cross-sectional view of a heating casserole on the tray in a box-type container and showing the means for supporting the tray in the container and the means for electrically connecting the heating element of the heating casserole to electrical connecting means in the container; and FIG. 3 is a schematic diagram showing the heating casseroles connected to an electrical timing device, the various types of casseroles and the position of thermocouples used in determining the temperature of the food within the casseroles.

DETAILED DESCRIPTION

An exemplary tray for supporting the casseroles is shown in FIG. 1. It may be made of polymeric meterials such as styrene and is formed with recesses 11 suitably shaped to seat individual casseroles. Tray 10 may have a hollow interior 12 which serves as a thermal barrier of dead air. Hollow interior 12 may be filled with a suitable insulation such as glass fiber or tray 10 may be molded from solid sections of polystyrene. The trays contain handles 13 for convenience in handling. The bottom of an end recess 11 contains a pair of metal contact plates 14 and 15 which extend completely through the tray and are flush with its bottom surface as best seen in FIG. 2.

Although the thermally insulated tray 10 is preferred, it is to be understood that a thermally insulated tray is not absolutely essential for storing the food for several hours within safe pathogenic limits. Any flat tray such as an ordinary cafeteria tray 10a (schematically shown in FIG. 3) which provides electrical contacts such as plates 14 and 15 to provide electrical connection with the heating element of the heating casseroles and ribs 11a to secure the trays in position (schematically shown in FIG. 3) will operate satisfactorily to support the casseroles.

Referring to FIG. 2 the tray 10 and a casserole are shown in cross section view supported in a container 16. Each of the trays 10 may be supported for slideable movement into and out of container 16 by means of a series of shelf-support members 20 and 21 (only one pair shown). The shelf members are suitably secured to the inner walls of the container. The container is supported on a flat surface by legs 22. In FIG. 2, the container 16 indicates a double wall thermally insulated container as described in the co-pending application. However, as explained above, the trays with the food-laden heated and unheated casseroles may be placed in any type of container without thermal insulating properties. A container of this type is schematically shown in FIG. 3. The basic purpose of the container is simply to support a plurality of trays and provide electrical connection between the heating elements of the heating casseroles and an electric timer, the latter connected to a power source.

The construction of the casseroles 17 per se and particularly the heating casserole for cooking the entree food placed therein consists of a metal dish-shaped member 44, the upper peripheral edges thereof terminating in a lip 45 which mates with a similar lip member on the periphery of a base 46 which is also dish-shaped and preferably molded from suitable polymeric material such as polysulfone and having adequate thermal insulating characteristics. A gasket 47 adheres to the upper peripheral edges of dish 44 and base 46 adjacent their common juncture seals and adheres dish 44 to base 46 so that the former is suspended within base 46 and in spaced relation thereto to form a thermally insulating air void 48 between the dish and base. The lower portion or bottom wall of dish 44 interfacing with base 46 has an electric heating element or resistor 49 integrally formed with the dish and insulated therefrom by a suitable dielectric layer 50 bonded to the dish. Element 49 may be a wire resistor although it is preferred to use a thick film resistor bonded to the dielectric layer 50 so that heat produced by the resistor will be efficiently transferred up through dish 44 to the food contained thereon. Suitable leads from the resistor 49 are connected to resilient contacts 51 and 52 disposed in void 48. The opposite end of the resilient contacts 51 and 52 are connected to metal discs 53 and 54 embedded in the bottom of base 46. Discs 53 and 54 contact the plates 14 and 15 of tray 10. The opposite ends of plates 14 and 15 are in contact with electrically conductive contact members 32 integral with shelf support members 20 and 21 and which lead to a timer and power source to interconnect the element 49 to the timer and source. This is schematically indicated in FIG. 3.

It is referred that metal dish 44 has a low heat capacity so that substantially all the heat produced by resistor 49 will pass through the dish into the food. Highly responsive thermal characteristics are essential to the dish so that there is no lag in the transfer of heat from the element to the food upon initial energization of the element and the resulting production of heat. Further, substantially complete passage of heat through the dish 44 during cooking reduces heat transferred to the ambient air and surrounding environment in container 16. Additionally, rapid transfer reduces any lag or continued heat transfer once resistor 49 is de-energized. These characteristics are essential to provide the combination of thermally insulated casseroles and pulsed energy cooking.

A dish 44 comprising 20 gauge porcelain enamel coated mild steel having a weight of 1.5 pounds per square foot and a heat capacity of .520 calories per square inch per degree Centigrade was found to operate highly satisfactorily. Air void 48 provides a thermally insulating space below resistor 49 to prevent excessive heat loss from the bottom of the casserole. If desired, the void 48 may be filled with insulating material such as glass fiber.

A suitably thermally insulated cover 55 is formed to resiliently fit over the top of each casserole 17. A rigid molded foamed polystyrene cover was found to be highly satisfactory for this purpose.

As schematically shown in FIG. 3 each heating casserole 17 is interconnected by means of suitable electrically conductive contacts (such as contact members 32) to a timing circuit generally designated 56. Power leads 57 and 58 are connected to a power source. Power lead 57 is connected to a bus bar 59 contiguous with the container (schematically shown) which in turn is suitable connected to one of the contact members 32 (schematically shown in the drawings as leads 32a and 32b) on each shelf support 20. Power lead 58 is connected to switches 60 and 61 operated by timer 62. Timer 62 is in turn connected to the other contact member 32 in one of the shelf supporting members (as best visualized by viewing FIG. 2) supporting each heating casserole by means of the schematically shown leads 63 and 64.

The circuit to each heating casserole can thus be energized by closing the appropriate switch (e.g., switch 60 to energize heating casserole 17 and designated B; and switch 61 to energize heating casserole 17 and designated C in FIG. 3).

Although each heating casserole can be constantly energized throughout a predetermined cooking period by switches 60 and 61, it is preferred to integrate timer 62 with switches 60 and 61, so that they operate as a single controlling unit to pulse energize the heating elements of teh heating casseroles in discrete on-and-off intervals (e.g., 10 seconds on and 15 seconds off, etc.) throughout the cooking interval or period. When the electrical energy and the resultant thermal energy are applied in pulsations of this nature, the heat is applied in spaced intervals of time to reduce the possibility of scorching the food, i.e., allowing the food during the off intervals to absorb heat induced during the on intervals. It is found by applying heat in this manner, the use of thermostats may be avoided and the food is cooked faster and with a higher degree of quality. Timer 62 and the switches can also be used to selectively energize the heating casseroles, i.e., heating casserole B in FIG. 3 can be energized by closing and opening switch 60 while heating casserole C is retained in unheated condition by causing the timer 62 to retain switch 61 in open position. In a system consisting of several shelves containing trays 10 and a plurality of heating casseroles, one or more selected heating casseroles can be selectively energized while the non-selected heating casseroles are retained in unheated state.

The unheated casseroles 17 (such as casseroles A, D, E, and F of FIG. 3) are not associated with tming circuit 56. They contain frozen and/or chilled side dish foods (salads, ice creams, jellos, etc.) and, of course, are not heated. The unheated casseroles 17 containing side dishes may be constructed the same as the heatng casserole so that they may be alternately used for heating entrees and containing side dishes. Conversely, they may be constructed without heating elements 49 and dielectric layer 50. Other forms of unheated side dishes casseroles may be used. For example, they may be constructed in the form of a cap 17a (schematically shown in FIG. 3) consisting of 1 inch thick styrofoam or in the form of bowl-shaped dishes of styrofoam and the like for salads. The construction of the casseroles 17, as shown in FIG. 2 provides an overall heat transfer coefficient of approximately 0.3 BTU per hr. per °F. Other casseroles, such as casserole 17a, may be easily constructed within these parameters.

The insulation characteristics of the casseroles retard the exchange of heat between the contents of the casseroles and the ambient air. This retardation prevents pathogenic damage to the food during storage periods of several hours duration and to the side dishes for the additional cooking or heating period of the entree. The initial low temperature levels of the heat sink (food) provides self-refrigeration until the food temperature reaches the temperature levels of the surrounding ambient air. The casseroles augment the self-refrigeration factor by providing a surrounding sheath of insulation.

Table I shows recordings of temperatures in °F of entree meals and side dish food retained in the casseroles for a 3 hour storage period plus an 18 minute entree meal cooking period. Thermocouples were placed at the bottom of the food in each casserole as schematically shown in FIG. 3. Entrees consisted of steak, club potatoes, and peas; the chilled side dish was a salad and the frozen side dish consisted of ice cream. In this recording the casseroles E and F consisted of 1 inch thick styrofoam cups schematically shown as casserole F in FIG. 3. All other foods were retained in casseroles constructed as described with respect to casserole 17 of FIG. 2. All food was introduced into the system at the temperature level shown for zero minutes in Table I. The unit was placed in a metal container similar to that schematically shown in FIG. 3.

The temperature levels of the chilled entree foods in casserole B reached 66°F after a 3 hour storage period, but during cooking the chilled entrees reached 168°F. This latter temperature is sufficient to destroy any slow growth of bacteria (e.g., psychrophiles, mesophiles and thermophiles) that may have occured during the non-refrigerated storage period. The frozen entree food in casserole C did not exceed 32°F during the 3 hour storage period. At the conclusion of the 18 minute cooking period, the frozen entree in casserole C reached a temperature level of 161°F.

TABLE I

| | CASSEROLES | | | | | |
|---|---|---|---|---|---|---|
| | B | C | E | F | A | D |
| Time In Minutes | Thermo 2 Chilled Entree (116 grams) | Thermo 5 Frozen Entree (105 grams) | Thermo 1 Ice Cream (56 grams) | Thermo 6 Ice Cream (58 grams) | Thermo 3 Salad (131 grams) | Thermo 4 Salad (124 grams) |
| 0 | 33 | 8 | −10 | 0 | 35 | 35 |
| 15 | 37 | 13 | −6 | 3 | 38 | 40 |
| 30 | 42 | 17 | 0 | 7 | 41 | 45 |
| 45 | 46 | 21 | 5 | 11 | 44 | 49 |
| 60 | 49 | 23 | 7 | 13 | 46 | 52 |
| 75 | 52 | 25 | 11 | 16 | 49 | 55 |
| 90 | 54 | 26 | 13 | 17 | 50 | 58 |
| 105 | 57 | 27 | 16 | 18 | 52 | 60 |
| 120 | 60 | 27 | 17 | 20 | 54 | 61 |
| 135 | 62 | 27 | 18 | 21 | 55 | 63 |
| 150 | 64 | 28 | 19 | 22 | 56 | 65 |
| 165 | 65 | 30 | 20 | 22 | 56 | 65 |
| 180 | 66 | 32 | 21 | 23 | 57 | 65 |
| Time of Cooking Entrees | | | | | | |
| 0 | 66 | 32 | 21 | 23 | 57 | 65 |
| 5 | 97 | 35 | 22 | 24 | 57 | 66 |
| 10 | 128 | 106 | 22 | 24 | 58 | 67 |
| 14 | 144 | 135 | 22 | 24 | 58 | 67 |
| 15 | 166 | 141 | 23 | 24 | 58 | 67 |
| 18 | 168 | 161 | 24 | 24 | 59 | 67 |

The ice cream in the two styrofoam containers (casseroles F and E) were continually retained at below freezing temperatures and, thus, did not reach temperature levels conducive to melting and bacterial growth.

Although the temperature levels of the salads (casseroles A and D) ranged from 35° to 67°F during the 3 hour storage period and the 18 minute cooking period, such temperature levels during this duration of time are not sufficient to provide a bacterial generation time which would produce pathogenic effects to salads. For example, Michael J. Pelczar, Jr. and Roger D. Reed in their text "Microbiology" (McGraw Hill Publishing Company, 1958) indicate that although the optimum generation time for psychrophiles ranged from approximately 52° to 70°F; the optimum generation time for mesophiles is approximately 80° to 105°F and for thermophiles 113° to 140°F. However, this is a general average for all foods for these particular strains of bacteria.

As shown in Table I the salad in casserole D attained temperature levels above 52° for approximately 2 hours and 18 minutes. However, this would not be a sufficient time for harmful bacterial growth. Salads usually consist of lettuce and a dairy product such as cottage cheese or salad dressings. Lettuce and dairy products of this nature may be maintained at these temperature ranges for short periods (e.g., 2 hours and 18 minutes) without harmful pathogenic effects. See for example, Hobbs "Food Poisoning and Food Hygiene" (Edward Arnold, Ltd., London, 1968), Table 7-1 and FIG. 6. The optimum bacterial generation rate for milk (a basic dairy product) approximately doubles every 20 minutes (Table 7-1) and the temperature levels that provide optimal bacterial generation is between 97° and 100°F (see FIG. 6).

Thus, the thermal insulation of the casseroles which retards the rate of heat exchange between the casserole contents and the surrounding environment combined with the initial low temperature levels of the food stuffs placed therein extend the time interval for safe non-refrigerated storage. These conditions reduce any possibility of pathogenic damage to the food due to bacterial generation. Entrees may be safely stored for periods up to several hours. The frozen side dish food (ice cream) was contained in frozen state during the 3 hour storage period and during the subsequent cooking of the entree. No change of phase took place and thus, no substantial bacterial growth occured. The chilled salad side dish food did not, during the 3 hour and 18 minute period, reach temperature levels that would produce pathogenic damage to such type of food during this interval of time.

Further, the thermal insulation properties of the casseroles sufficiently retard the rate of heat exchange so that the heating casseroles can be selectively energized. In other words, casserole B (see FIG. 3) can be energized for cooking and the tray with the side dish casseroles F and A removed for serving at any time during the storage period while casseroles E, D, and C remain in the system for storage up through the entire 3-hour period.

In a system where multiple shelves are used, series of entrees can be selectively cooked and served with their associated side dishes while other trays of entrees and side dishes are retained in the system for the full storage period. Almost all of the heat escaping from the heating casseroles during this period is absorbed by the interior of container 16a and the trays per se rather than the food contained in the isolated unheated insulated casseroles.

In some cases it may be desired not to cook some of the entrees and serve them with their associated side dishes at the conclusion of the storage period. In such situations the frozen and chilled foods are removed in their casseroles from the system and placed respectively in a freezer and refrigerator until it is desired to recycle them in the system at some subsequent time.

As can be readily understood, the rate of heat exchange between the casseroles and ambient air can be reduced further (and thus, temperature levels of uncooked food retained at lower levels) by providing additional insulation to the casseroles 17. This may be accomplished by filling void 48 with insulation, providing further insulation to cover 55 or providing thicker walls to the styrofoam casseroles 17a.

What is claimed is:

1. A method for storing food in a plurality of individual casseroles and during storage cooking food in selected casseroles while continuing to store uncooked food in the remaining casseroles comprising:
   a. placing refrigerated entree food in thermally insulated individual casseroles each having an integral heating element which when selected to cook the food is connected to an electric circuit controlled by a timer to energize said element of said selected casseroles in pre-determined on and off intervals to cook food in said selected casseroles by means of the heat generated by said heating element;
   b. placing refrigerated side dish food in thermally insulated individual casseroles which are unconnected to electric circuit;
   c. placing said individual casseroles in spaced-apart relationship on a tray;
   d. storing the food in said casseroles on said tray for a period of from about 15 minutes to about 3 hours; the thermal insulation of each of said casseroles and the temperature levels of the refrigerated entree foods and the refrigerated side dish food as placed in said casseroles preventing degradation of said food during storage of same;
   e. during said storage period, cooking entree food in selected casseroles for a period of about 18 minutes by energizing said heating elements of said selected casseroles by means of said electric circuit and timer in on intervals of 10 seconds followed by off intervals of 15 seconds duration; and
   f. during said cooking period retaining on said tray entree food in unselected individual casseroles the heating element of which are not connected to said circuit and said refrigerated side dish food in said individual casseroles which are unconnected to said circuits, the thermal insulation of said casseroles and the temperature levels of said refrigerated entree food and said refrigerated side dish food as placed in said casseroles preventing degradation of the food in said casseroles during said cooking period.

\* \* \* \* \*